US012729150B2

(12) United States Patent
Kuniyoshi et al.

(10) Patent No.: US 12,729,150 B2
(45) Date of Patent: Sep. 8, 2026

(54) BLACK QUARTZ GLASS AND METHOD FOR PRODUCING SAME

(71) Applicant: TOSOH SGM CORPORATION, Yamaguchi (JP)

(72) Inventors: Minoru Kuniyoshi, Yamaguchi (JP); Manabu Sakurai, Yamaguchi (JP)

(73) Assignee: TOSOH SGM CORPORATION, Yamaguchi (JP)

( * ) Notice: Subject to any disclaimer, the term of this patent is extended or adjusted under 35 U.S.C. 154(b) by 825 days.

(21) Appl. No.: 18/248,162

(22) PCT Filed: Sep. 16, 2021

(86) PCT No.: PCT/JP2021/034016
§ 371 (c)(1),
(2) Date: Apr. 6, 2023

(87) PCT Pub. No.: WO2022/075028
PCT Pub. Date: Apr. 14, 2022

(65) Prior Publication Data

US 2023/0406753 A1 Dec. 21, 2023

(30) Foreign Application Priority Data

Oct. 7, 2020 (JP) ................................ 2020-169478
Sep. 9, 2021 (JP) ................................ 2021-146784

(51) Int. Cl.
*C03C 3/083* (2006.01)
*C03C 4/02* (2006.01)
*C03C 4/08* (2006.01)

(52) U.S. Cl.
CPC ................ *C03C 3/083* (2013.01); *C03C 4/02* (2013.01); *C03C 4/082* (2013.01); *C03C 4/085* (2013.01); *C03C 2203/10* (2013.01)

(58) Field of Classification Search
CPC .......... C03C 3/083; C03C 4/02; C03C 4/082; C03C 4/085
See application file for complete search history.

(56) References Cited

U.S. PATENT DOCUMENTS 3,484,258 A 12/1969 Redwine
3,962,515 A 6/1976 Dumbaugh
5,013,605 A * 5/1991 Gritz ........................ C03C 4/02 428/428
10,005,693 B2 6/2018 Hirai
2015/0239772 A1 8/2015 Baker

FOREIGN PATENT DOCUMENTS

CN 1461740 A 12/2003
CN 105601127 A 5/2016
CN 106927672 A 7/2017
CN 111615501 A 9/2020
JP 2000-327405 A 11/2000
JP 2003-146676 A 5/2003
JP 2004026580 A 1/2004
JP 2005-194118 A 7/2005
JP 2013-001628 A 1/2013
JP 2014-094864 A 5/2014
JP 2017-509574 A 4/2017
JP 2020-073440 A 5/2020
WO 2004050570 A1 6/2004
WO 2008105191 A1 9/2008
WO 2015067688 A1 5/2015
WO 2015126900 A1 8/2015
(Continued)

OTHER PUBLICATIONS

Schultz et al., Silica-Rich Glasses in the TiO2—Al2O3—SiO2 System, 1980, Journal of Non-Crystalline Solids, 38 &39, 33-37 (Year: 1980).*
Stolyarova et al., high-temperature mass spectrometric study of thermodynamic properties in the TiO2—Al2O3—SiO2 system and modeling, Rapid Commun Mass Spectrom, 2022 , 36:e9359, 1-17 (Year: 2022).*
International Search Report and Written Opinion for corresponding International application No. PCT/JP2021/034016; dated Nov. 22, 2021 (11 pages) Partial Translation.
International Preliminary Report and Patentability for corresponding International application No. PCT/JP2021/034016; dated Mar. 28, 2023 (11 pages) Machine Translation.
Kajiwara, M., “Formation and crystallisation of Al2O3—TiO2—SiO2 glasses.” Glass Technology 29.5 (1988): 188-192.
Office action for corresponding European application No. 21877330.7; dated May 12, 2025 (7 pages).
(Continued)

*Primary Examiner* — Elizabeth A. Bolden
(74) *Attorney, Agent, or Firm* — Mendelsohn Dunleavy, P.C.; Kevin J. Dunleavy

(57) ABSTRACT

The present invention relates to a black quartz glass consisting of a composition comprising 63 to 65 mass % of $SiO_2$, 18 to 24 mass % of $TiO_2$, and 12 to 17 mass % of $Al_2O_3$, wherein the sum of $SiO_2$, $TiO_2$ and $Al_2O_3$ is 100 mass %; and to a method for producing black quartz glass comprising: mixing 63 to 65 mass % of a $SiO_2$ powder, 18 to 24 mass % of a $TiO_2$ powder and 12 to 17 mass % of an $Al_2O_3$ powder, filling the mixed powder into a mold and then melting at a maximum temperature of 1700 to 1900° C. in an oxygen-free atmosphere, and cooling to room temperature to obtain the black quartz glass; and further to a product comprising a black quartz glass member made of the black quartz glass. The present invention allows to provide a black quartz glass which has an excellent light-shielding property, has no risk of causing contamination in a step of using it, has sufficient color uniformity when the size is enlarged, and is capable of producing a large ingot, and to provide a method for producing the black quartz glass with excellent productivity even in the large ingot, and to provide a black quartz glass product made of the black quartz glass.

20 Claims, No Drawings

(56) References Cited

FOREIGN PATENT DOCUMENTS

WO 2019108823 A1 6/2019

OTHER PUBLICATIONS

Office action for corresponding Singaporean application No. 11202302539S; dated Jun. 6, 2025 (7 pages).

Office action for corresponding Chinese application No. 202180069147.4; dated Aug. 5, 2025 (11 pages). Machine Translation.

Office action for corresponding Chinese application No. 202180069147.4; dated Mar. 22, 2025 (12 pages). Machine Translation.

Office Action based on corresponding Taiwanese application No. 110136672; dated Feb. 6, 2025 (14 pages). Machine Translation.

* cited by examiner

BLACK QUARTZ GLASS AND METHOD FOR PRODUCING SAME

TECHNICAL FIELD

The present invention relates to a black quartz glass, a method for producing the same, and a black quartz glass product. More specifically, the present invention relates to a black quartz glass which can be used for a quartz glass cell for optical analysis, a reflector for projectors, a connector for optical fibers, a light-shielding member or an infrared heat absorption/storage member for semiconductor manufacturing apparatuses or for infrared heating apparatuses, or the like, and a producing method to efficiently obtain the black quartz glass.

CROSS REFERENCE TO RELATED APPLICATIONS

This application claims priority to Japanese Patent Application No. 2020-169478, filed on Oct. 7, 2020, and Japanese Patent Application No. 2021-146784, filed on Sep. 9, 2021, the entire descriptions of which are expressly incorporated herein by reference.

BACKGROUND ART

The quartz glass is used in various applications such as lighting equipments, optical equipment components, semiconductor industrial members, and physicochemical equipments by taking advantage of its good light transmittance in the range from ultraviolet to infrared, low thermal expansion, and chemical resistance. In this situation, a black glass, in which a small amount of transition metal oxide is added to the quartz glass, is used for a portion where local light-shielding is required, and is used for optical equipment components, such as quartz glass cells for optical analysis. However, in recent years, miniaturization and thinning of components have been advancing, and the conventional black glass sometimes lacks the light-shielding property, and thus there is a need for the black quartz glass having a higher light-shielding property.

In addition, in projector applications, the black quartz glass is required to efficiently shield leaking light from the reflector in order to prevent negative effects on the optical system inside the projector, due to the high brightness of the bulb for making the projection screen brighter.

In optical fiber applications, it is necessary to prevent irregular reflection caused by leaking light in a connector which connects optical fibers, so with the increase in optical transmission density, the black quartz glass is required to have high light-shielding property.

In addition, the quartz glass has some other advantages, such as a high heat resistance and a high chemical purity, and is also widely used in tools for semiconductor manufacturing and other applications. However, in recent years, a heating loss has become a problem in a heat treatment step of semiconductor manufacturing processes, and in a heating process with an infrared light, there is a need for the shielding member against infrared irradiation to parts other than the target object to be heated and for the infrared heat absorption/storage member for efficient heating of the target object. Therefore, there is a demand for the development of the black quartz glass that effectively shields infrared rays, that has an excellent infrared heat absorption/storage property, and that is capable of producing large members without metallic impurities that cause process contamination.

Conventionally, the following black quartz glasses containing silica as a main component are known.

For example, Patent Literature 1 proposes a method for producing the black quartz glass by mixing a quartz glass powder and niobium pentachloride, converting the niobium pentachloride to niobium pentoxide, and then heating to 1800° C. or more to reduce and melt.

Patent Literature 2 proposes producing the black quartz glass containing carbon derived from a volatile organosilicon compound, which was obtained by subjecting a silica porous glass to a gas phase reaction with the organosilicon compound that can serve as a carbon source, and then heating and sintering at a temperature of 1200° C. or more and 2000° C. or less.

Patent Literature 3 proposes producing the black quartz glass as a composite material having a fused silica matrix in which regions of Si in elemental form are embedded, by wet-mixing a fused silica powder obtained from pulverization of molten quartz glass and a silicon-containing powder, molding by a casting method and drying, and then heating the obtained molded body at a sintering temperature below the melting temperature of silicon, 1350 to 1435° C.

Patent Literature 4 proposes a colored glass sintered body in which carbon is dispersed as colored particles having a volume ratio of 0.1% to 30% in the matrix of the glass sintered body.

Patent Literature 5 discloses a $TiO_2$-containing silica glass. A method, as the method for producing this silica glass, is proposed, in which fluorine is contained into a porous $TiO_2$—$SiO_2$ glass body obtained by depositing soot obtained by flame hydrolysis of gasifiable Si and Ti precursors, and thereafter, the temperature is finally raised to a vitrification temperature to obtain black quartz glass.

Patent Literature 6 discloses a colored alumina sintered body. The sintered body is obtained by mixing $Al_2O_3$, $TiO_2$ and $Cr_2O_3$ with sintering aid components of CaO, $SiO_2$ and MgO, and sintering in a reducing atmosphere.

Patent Literature 1: JP-A-2014-94864
Patent Literature 2: JP-A-2013-1628
Patent Literature 3: JP-A-2020-73440
Patent Literature 4: JP-A-2003-146676
Patent Literature 5: JP-A-2005-194118
Patent Literature 6: JP-A-2000-327405

The entire description of Patent Literatures 1 to 6 is expressly incorporated herein by reference.

SUMMARY OF INVENTION

Technical Problem

However, the black quartz glass described in Patent Literature 1 may have insufficient color uniformity when it is enlarged, and has a problem in productivity. In addition, it is difficult to apply it to the semiconductor manufacturing field since the niobium compound contained therein may cause contamination in a step of using it.

The black quartz glass described in Patent Literature 2 also has the problem in color uniformity, and it is difficult to enlarge the size.

In addition, it is difficult to apply it to the semiconductor manufacturing field since carbon contained therein may be generated as particles in a step of using it and cause contamination.

The black quartz glass of a kind described in Patent Literature 3 also may have insufficient color uniformity when it is enlarged. Furthermore, there is a problem in enlargement due to limitation of the casting molding. Moreover, the operations of casting and drying are complicated and it needs to take a long time for producing, resulting in a productivity problem.

The black quartz glass of a kind described in Patent Literature 4 also may have insufficient color uniformity when it is enlarged, and further has a problem that the risk of breakage in sintering molded bodies is increased when the size is enlarged and thus a large black quartz glass cannot be obtained. In addition, it is difficult to apply it to the semiconductor manufacturing field since carbon may be generated as particles in a step of using it and cause contamination.

$TiO_2$-containing silica glass described in Patent Literature 5 requires a step of depositing soot, which is a complex and complicated operation to produce, and thus has a problem in productivity. Furthermore, it is difficult to enlarge the size, and even if the size can be enlarged, the color uniformity may be insufficient in some cases.

The colored alumina-based sintered body described in Patent Literature 6 has some problems, for example, particle dropouts occur during thinning in a step of using it due to its grain boundaries, resulting in decrease of the yield of products. In addition, for raw materials for producing that, some of them are not easy to be obtained as high-purity powders, and furthermore, Mg and Ca, which are aversive elements in the semiconductor manufacturing process, are essential, making it difficult to apply to the semiconductor manufacturing process.

The black quartz glass or the like obtained by the above-described conventional method has the problems of the color uniformity when it is enlarged and of contamination, and it is difficult to enlarge in size by the method for producing the black quartz glass and there are some challenges with productivity. Furthermore, the colored alumina-based sintered body has the problem of decreasing of the yield due to the grain boundaries, the difficulty of obtaining some raw materials, and the essentiality of the aversive elements in semiconductor manufacturing process.

An object of the present invention is to provide a black quartz glass which has an excellent light-shielding property, has no risk of causing contamination in a step of using it, has sufficient color uniformity when the size is enlarged, and is capable of producing a large ingot.

Another object to be solved by the present invention is to provide a method for producing the black quartz glass, which achieves the object above, with excellent productivity even in the large ingot.

A further object of the present invention is to provide a black quartz glass product manufactured from the black quartz glass, such as an optical component, e.g. a spectroscopic cell, and a light-shielding member and an infrared heat absorption/storage member for semiconductor manufacturing apparatuses or for infrared heating apparatuses.

Solution to Problem

The present inventors had made intensive studies to solve the problems above, and as a result, they found that a quartz glass containing $SiO_2$ as a main component and further containing $TiO_2$ and $Al_2O_3$ in predetermined ranges is a black quartz glass having an excellent light-shielding property, and further that the black quartz glass can be obtained homogeneously without cracks and bubbles in the glass by mixing a $SiO_2$ powder, a $TiO_2$ powder and an $Al_2O_3$ powder in a predetermined composition and melting it, and thus they had completed the present invention.

The present invention is as follows.

[1]

A black quartz glass consisting of a composition comprising 63 to 65 mass % of $SiO_2$, 18 to 24 mass % of $TiO_2$ and 12 to 17 mass % of $Al_2O_3$, wherein the sum of $SiO_2$, $TiO_2$ and $Al_2O_3$ is 100 mass %.

[2]

The black quartz glass according to [1], wherein the SCE reflectance at a wavelength of 350 nm to 750 nm is 8% or less.

[3]

The black quartz glass according to [1] or [2], wherein the brightness L* is 20 or less, the absolute value of the saturation a* is 2 or less and the absolute value of b* is 9 or less in L*a*b* color system.

[4]

The black quartz glass according to any one of [1] to [3], wherein each content of metallic impurities other than Si, Ti and Al is 1 ppm or less.

[5]

The black quartz glass according to any one of [1] to [4], wherein the density is 2.3 g/cm$^3$ or more and 2.8 g/cm$^3$ or less.

[6]

The black quartz glass according to any one of [1] to [5], wherein the black quartz glass has a corrosion rate obtained by the following corrosion exposure test of ⅕ or less compared to the corrosion rate of a molten quartz glass obtained by the same corrosion exposure test:

Corrosion Exposure Test:

(1) preparing a glass sample of 20 mm×20 mm×2 mm thickness and masking a 7 mm×7 mm area after forming an optical mirror surface on its surface;

(2) etching the entire surface of the masked glass surface with a reactive ion-etching apparatus, at 200 W for 4 hours under 14 Pa of the pressure in the apparatus, while flowing simultaneously $CF_4$ gas, $O_2$ gas and Ar;

(3) removing the mask from the glass surface and measuring the step size between the masked area and the corroded non-masked area;

(4) calculating the corrosion rate by the step size/the etching time.

[7]

The black quartz glass according to any one of [1] to [6], wherein the thermal expansion coefficient in the range of 30° C. to 600° C. is $20\times10^{-7}$/° C. or more and $30\times10^{-7}$/° C. or less.

[8]

The black quartz glass according to any one of [1] to [7], wherein the optical transmittance at a wavelength of 200 nm to 3000 nm with a thickness of 1 mm is 0.1% or less.

[9]

A method for producing black quartz glass comprising:

mixing 63 to 65 mass % of a $SiO_2$ powder, 18 to 24 mass % of a $TiO_2$ powder and 12 to 17 mass % of an $Al_2O_3$ powder, filling the mixed powder into a mold and then melting at a maximum temperature of 1700 to 1900° C. in an oxygen-free atmosphere, and cooling to room temperature to obtain the black quartz glass according to any one of [1] to [8].

[10]

The method for producing black quartz glass according to [9], wherein the oxygen-free atmosphere is a reduced pressure of 100 Pa or less, a $N_2$ atmosphere, an Ar atmosphere, a He atmosphere or a combination thereof.

[11]

The method for producing black quartz glass according to [9] or [10], wherein the mold to be filled with the mixed powder has a shape similar to the shape after mechanical processing, with the volume of 1.01 or more of the shape after mechanical processing.

[12]

A product comprising a black quartz glass member made of the black quartz glass according to any one of [1] to [8].

[13]

The product according to [12], wherein the black quartz glass member is an optical component, a light-shielding member or an infrared heat absorption/storage member.

[14]

The product according to [13], wherein the optical component is a spectroscopic cell, a reflector for projectors or a connector for optical fibers, and the light-shielding member is a light-shielding member for semiconductor manufacturing apparatuses or for infrared heating apparatuses.

Advantageous Effect of Invention

The present invention allows to provide a black quartz glass that is a homogeneous glass without cracks and bubbles and has a high light-shielding property. The black quartz glass is homogeneous and excellent in the light-shielding property without losing good processability and low dust generation property as transparent quartz glass has. Thus, the present invention can be suitably used for a quartz glass cell for optical analysis, a reflector for projectors, a connector for optical fibers, a light-shielding member or an infrared heat absorption/storage member for semiconductor manufacturing apparatuses or for infrared heating apparatuses, or the like. In addition, the producing method of the present invention allows to easily produce the black quartz glass without losing good processability and low dust generation property as high purity and transparent quartz glass has.

EMBODIMENTS OF INVENTION

<Black Quartz Glass>

The black quartz glass of the present invention will be described. The black quartz glass of the present invention has a composition comprising 63 to 65 mass % of $SiO_2$ as a main component, 18 to 24 mass % of $TiO_2$ and 12 to 17 mass % of $Al_2O_3$, wherein the sum of $SiO_2$, $TiO_2$ and $Al_2O_3$ is 100 mass %. When the composition falls in the range above, the black quartz glass can be specifically obtained having a homogeneity without cracks and bubbles. When the composition falls outside the range above, color unevenness, inclusion of bubbles or the like generate, and the homogeneous glass phase is not obtained, and the good processability and low dust generation property as transparent quartz glass has are lost. The composition of the black quartz glass of the present invention is preferably in the range of 63.5 to 65.0 mass % of $SiO_2$, 18.5 to 23.5 mass % of $TiO_2$ and 12.5 to 17.0 mass % of $Al_2O_3$.

The black quartz glass of the present invention preferably has an SCE reflectance at a wavelength of 350 nm to 750 nm of 8% or less. The SCE reflectance at a wavelength of 350 nm to 750 nm is measured in accordance with JIS Z 8722. The SCE reflectance of 8% or less allows to exhibit an excellent light-shielding property. The SCE reflectance is preferably low in terms of excellent light-shielding property, preferably 7% or less, and more preferably 5% or less. The lower limit of the SCE reflectance is not particularly limited, but may be 1%.

In L*a*b* color system, the black quartz glass of the present invention preferably has the brightness L* of 20 or less, and preferably has the absolute value of the saturation a* of 2 or less and the absolute value of b* of 9 or less. When the brightness L is 20 or less, not only color unevenness does not generate, but also the black-based color can be sufficiently exhibited not to generate light transmission, stray light and light scattering. In addition, when the absolute value of the saturation a* is 2 or less and the absolute value of b* is 9 or less, the color tone of the glass body becomes blacker, making the SCE reflectance of the black quartz glass lower. Preferably, the brightness L* is 18 or less, and the absolute value of the saturation a* is 1.8 or less and the absolute value of b* is 8.5 or less, in terms of a blacker color tone.

In the black quartz glass of the present invention, each content of metallic impurities other than Si, Ti and Al is preferably 1 ppm or less. When the contents of the metallic impurities are 1 ppm or less, the occurrence of process contamination in semiconductor manufacturing or the like can be suppressed. In addition, adverse effects on accuracy due to fluorescent generation or the like can be suppressed in the field of optical analysis or the like. The contents of metallic impurities other than Si element can be analyzed by an atomic absorption analysis method or the like.

The black quartz glass of the present invention may have a density of 2.3 $g/cm^3$ or more and 2.8 $g/cm^3$ or less. The density is almost the same as the theoretical density of molten glass obtained from transparent quartz glass with $TiO_2$ and $Al_2O_3$. The density is preferably in the range of 2.4 $g/cm^3$ or more and 2.7 $g/cm^3$ or less.

The black quartz glass of the present invention may have a corrosion rate of ⅓ or less compared to the corrosion rate of a molten quartz glass, under a corrosion environment in a reactive ion etching equipment (200 W) where a $CF_4$ gas, an $O_2$ gas and Ar are simultaneously flowed. The molten quartz glass used as a control is produced by heating and melting a natural quartz powder with an oxyhydrogen burner. Such a black quartz glass having excellent corrosion resistance can be used as a member for manufacturing semiconductors, a member for manufacturing liquid crystals, a member for manufacturing MEMS or the like, and allows to significantly reduce particle generation and slipping even in a corrosive environment.

The black quartz glass of the present invention may have a thermal expansion coefficient of $20\times10^{-7}$/° C. or more and $25\times10^{-7}$/° C. or less. The expansion coefficient is about ⅓ to ¼ smaller than the thermal expansion coefficient of alumina ceramics of $80\times10^{-7}$/C and the thermal expansion coefficient of titania ceramics of 70 to $100\times10^{-7}$/° C. Thus, it can be suitably used in an environment where the dimensional accuracy is required at a high temperature, e.g. optical systems in projectors.

The black quartz glass of the present invention preferably has an optical transmittance at a wavelength of 200 nm to 3000 nm with a thickness of 1 mm of 0.1% or less. The optical transmittance at a wavelength of 200 nm to 3000 nm is measured with a spectrophotometer. The optical transmittance of 0.1% or less allows to exhibit an excellent light-shielding property. The optical transmittance is preferably low in terms of excellent light-shielding property, preferably 0.07% or less, and more preferably 0.05% or less. The lower limit of the optical transmittance is not particularly limited, but may be 0.01%.

<Method for Producing Black Quartz Glass>

A method for producing the black quartz glass of the present invention will be described. The method for producing the black quartz glass of the present invention comprises: mixing 63 to 65 mass % of a $SiO_2$ powder, 18 to 24 mass % of a $TiO_2$ powder and 12 to 17 mass % of an $Al_2O_3$ powder, filling the mixed powder into a mold and then melting at a maximum temperature of 1700 to 1900° C. in an oxygen-free atmosphere, and cooling to room temperature to obtain the black quartz glass of the present invention.

The $SiO_2$ powder, $TiO_2$ powder and $Al_2O_3$ powder are preferably high-purity powders from the viewpoint of obtaining the black quartz glass having a low impurity content. High-purity powders of the $SiO_2$ powder, $TiO_2$ powders and $Al_2O_3$ powder are readily available commercially. For the high-purity powders, each content of metallic impurities other than Si, Ti and Al is preferably 1 ppm or less. Although there is no particular limitation on the particle size and shape of the raw material powders, it is preferable to appropriately select the particle size and shape of each raw material so that the three components are homogeneously mixed and dispersed. The particle size is preferable to be relatively small from the viewpoint of easy melting of the mixed powder, for example, the average particle size may be in the range of 0.1 to 300 μm.

The raw material powder is obtained by mixing the raw materials in a dry powder form. The percentages of the $SiO_2$ powder, $TiO_2$ powder and $Al_2O_3$ powder are selected from the ranges of 63 to 65 mass %, 18 to 24 mass % and 12 to 17 mass %, respectively, depending on the composition of the black quartz glass. In general, melts of $SiO_2$, $TiO_2$ and $Al_2O_3$ have phase separation and contain large amounts of cracks and visible bubbles, so the resulting glass is incompatible with practical use. However, the investigations of the inventors had revealed that, surprisingly, the composition range of the present invention allows to obtain a quartz glass that is homogeneous without phase separation, cracks and bubbles in the glass and that exhibits a black color. Furthermore, the obtained quartz glass was a black quartz glass having high shielding property without losing good processability and low dust generation property. The mixing of the raw material powder can be performed with a general mixing device such as, a stirrer-type mixer, a ball mill, a rocking mixer, a cross mixer, or a V-type mixer.

The raw material powder obtained by mixing is filled into a mold having a desired shape. Although there is no particular limitation on the shape of the mold, it is desirable that the mold has a shape similar to the shape after mechanical processing, with the volume of 1.01 times or more of that after mechanical processing, in the viewpoint that the products can be efficiently obtained due to the close to the shape of products after mechanical processing. The mold is not particularly limited, but may be, for example, a mold made of carbon.

The melting of the raw material powder is performed by heating the raw material powder filled into the mold at a maximum temperature of 1700 to 1900° C., preferably 1750 to 1850° C. in an oxygen-free atmosphere. If the maximum temperature is lower than 1700° C., vitrification becomes insufficient. Above 1900° C., vaporization of $SiO_2$ begins, which is undesirable. The oxygen-free atmosphere is, for example, a reduced pressure of 100 Pa or less, a $N_2$ atmosphere, an Ar atmosphere, a He atmosphere or a combination thereof. For example, the reduced pressure of 100 Pa or less can be followed by the $N_2$, Ar or He atmosphere, or a further subsequent pressure reduction to make a reduced $N_2$, Ar or He atmosphere. By the vitrification through heating and melting in the oxygen-free atmosphere, the black quartz glass is obtained. Even if vitrified through heating and melting in an oxygen-containing atmosphere, the glass is difficult to blacken, or the black quartz glass cannot be obtained. The heating and melting time is not particularly limited, but is 0.1 to 10 hours, for example. However, it is not intended to be limited to this range. The black quartz glass ingot of the present invention is obtained by cooling it to room temperature after melting, and removing from the mold.

A product made of black quartz glass can be obtained by processing the ingot of the black quartz glass obtained through the above-described steps using a processing machine which is used for producing quartz members, such as a band saw, a wire saw, or a core drill.

The black quartz glass thus obtained has no color unevenness, and exhibits a sufficient black-based color that does not generate light transmission, stray light and light scattering, and is useful in the entire field of optics.

<Products Including Black Quartz Glass Member>

The present invention encompasses a product including a black quartz glass member made of the black quartz glass of the present invention. The black quartz glass member may be, for example, an optical component, a light-shielding member or an infrared heat absorbing/storage member. The optical component is, for example, a spectroscopic cell, a reflector for projectors, or a connector for optical fibers, and the light-shielding member is, for example, a light-shielding member for semiconductor manufacturing apparatuses or for infrared heating apparatuses. However, the present invention is not intended to be limited to these members.

The black quartz glass of the present invention does not contain the aversive elements in semiconductor manufacturing processes, and is suitable for a member of a heat treatment apparatus used for semiconductor manufacturing. For example, in the wafer heat treatment apparatus, when a portion other than the surface for transmitting infrared rays for heating is constituted by the black quartz glass of the present invention, the heat radiated to the outside of the furnace can be efficiently shield, and it is possible to improve the energy efficiency and the uniformity of temperature distribution in the furnace.

EXAMPLES

Hereinafter, the present invention will be described in detail with Examples, but the present invention is not limited to the Examples.

Sample characteristics were measured as follows.

(1) The density of samples was measured by the Archimedes method.

(2) The SCE reflectance was measured for samples processed into a thickness of 7 mm, with a spectrocolorimeter, according to JIS Z 8722. The highest value in the wavelength range of 360 to 740 nm is described.

(3) The brightness L* and the saturation a*, b* in L*a*b* color system were measured with a spectrocolorimeter according to JIS Z 8722.

(4) The thermal expansion coefficient was measured by thermomechanical analysis (TMA method) at 30 to 600° C. for samples processed into 3×4×20 mmL.

(5) The optical transmittance was measured for samples processed into a thickness of 1 mm, with a spectrophotometer in 200 to 3000 nm.

(6) Corrosion exposure test for corrosion rate measurement:

(1) preparing a glass sample of 20 mm×20 mm×2 mm thickness and masking a 7 mm×7 mm area after forming an optical mirror surface on its surface; (2) etching the entire surface of the masked glass surface with a reactive ion-etching apparatus, at 200 W for 4 hours under 14 Pa of the pressure in the apparatus, while flowing simultaneously $CF_4$ gas, $O_2$ gas and Ar; (3) removing the mask from the glass surface and measuring the step size between the masked area and the corroded non-masked area; (4) calculating the corrosion rate by the step size/the etching time. The molten quartz glass used as a control is produced by heating and melting a natural quartz powder with an oxyhydrogen burner.

Example 1

A $SiO_2$ powder having each content of metallic impurities other than Si is 1 ppm or less, a $TiO_2$ powder having each content of metallic impurities other than Ti is 1 ppm or less, and an $Al_2O_3$ powder having each content of metallic impurities other than Al is 1 ppm or less were prepared. 64.5 mass % of the $SiO_2$ powder, 18.6 mass % of the $TiO_2$ powder and 16.9 mass % of the $Al_2O_3$ powder were mixed by a ball mill without solvents. The obtained raw material powder was filled into a mold, and heated in a nitrogen atmosphere at the maximum temperature of 1800° C. for 20 minutes to melt. After melting, the glass was cooled to room temperature to obtain a black quartz glass. The physical properties of the obtained black quartz glass were as follows. The density was 2.6 g/cm$^3$, the SCE reflectance was 3.3% or less, the optical transmittance was 0.05% or less in the range of 200 to 3000 nm, the thermal expansion coefficient was $25\times10^{-7}$/° C., and the brightness L* was 8.9, the saturation a* was 1.1 and b* was −6.8 in L*a*b* color system. The corrosion rate in the corrosion exposure test was 9.55 nm/min, which was 1/5.4 compared to 51.79 nm/min of the molten quartz glass. The obtained black quartz glass exhibited a sufficient black-based color that does not generate light transmission, stray light and light scattering, and was visually confirmed to be excellent in terms of aesthetic appearance without bubbles, cracks and color unevenness.

Example 2

With the same $SiO_2$ powder, $TiO_2$ powder and $Al_2O_3$ powder as in Example 1, 63.9 mass % of the $SiO_2$ powder, 23.2 mass % of the $TiO_2$ powder and 12.9 mass % of the $Al_2O_3$ powder were mixed by a ball mill without solvents. The obtained raw material powder was filled into a mold, and heated in a nitrogen atmosphere at the maximum temperature of 1800° C. for 20 minutes to melt. After melting, the glass was cooled to room temperature to obtain a black quartz glass. The physical properties of the obtained black quartz glass were as follows. The density was 2.6 g/cm$^3$, the SCE reflectance was 4.1% or less, the optical transmittance was 0.06% or less in the range of 200 to 3000 nm, the thermal expansion coefficient was $28\times10^{4}$/° C., and the brightness L* was 13.1, the saturation a* was 0.6 and b* was −7.1 in L*a*b* color system. The corrosion rate in the corrosion exposure test was 9.92 nm/min, which was 1/5.2 compared to 51.79 nm/min of the molten quartz glass. The obtained black quartz glass exhibited a sufficient black-based color that does not generate light transmission, stray light and light scattering, and was visually confirmed to be excellent in terms of aesthetic appearance without bubbles, cracks and color unevenness.

Comparative Example 1

With the same $SiO_2$ powder, $TiO_2$ powder and $Al_2O_3$ powder as in Example 1, 85.4 mass % of the $SiO_2$ powder and 11.2 mass % of the $TiO_2$ powder and 3.4 mass % of the $Al_2O_3$ powder was mixed by a ball mill without solvents. The obtained raw material powder was filled into a mold, and heated in a nitrogen atmosphere at the maximum temperature of 1800° C. for 20 minutes to melt. After melting, it was cooled to room temperature. The obtained melt was visually confirmed to have color unevenness, bubbles and cracks.

Comparative Example 2

With the same $SiO_2$ powder, $TiO_2$ powder and $Al_2O_3$ powder as in Example 1, 51.0 mass % of the $SiO_2$ powder, 24.0 mass % of the $TiO_2$ powder and 25.0 mass % of the $Al_2O_3$ powder were mixed by a ball mill without solvents. The obtained raw material powder was filled into a mold, and heated in a nitrogen atmosphere at the maximum temperature of 1800° C. for 20 minutes to melt. After melting, it was cooled to room temperature. The obtained melt was visually confirmed to have color unevenness, bubbles and cracks.

TABLE 1

| | Density g/cm$^3$ | SCE reflectance | L* | a* | b* | Optical transmittance % | Thermal expansion coefficient $\times10^{-7}$/° C. | Ratio of corrosion rates |
|---|---|---|---|---|---|---|---|---|
| Example 1 | 2.6 | 3.3% or less | 8.9 | 1.1 | −6.8 | 0.05 | 25 | 1/5.4 |
| Example 2 | 2.6 | 4.1% or less | 13.1 | 0.6 | −7.1 | 0.06 | 28 | 1/5.2 |

INDUSTRIAL APPLICABILITY

The present invention is useful in fields related to use and production of black quartz glasses. The method for producing black quartz glass of the present invention allows to economically and efficiently produce an enlarged black quartz glass having a homogeneity and an excellent light-shielding property without losing good processability and low dust generation property as transparent quartz glass has. The black quartz glass of the present invention is suitably used for optical components, such as a quartz glass cell for optical analysis, a reflector for projectors, and a connector for optical fibers, and a light-shielding member or an infrared heat absorption/storage member for semiconductor manufacturing apparatuses or for infrared heating apparatuses.

The invention claimed is:

1. A black quartz glass consisting of a composition comprising 63 to 65 mass % of $SiO_2$, 18 to 24 mass % of $TiO_2$ and 12 to 17 mass % of $Al_2O_3$, wherein the sum of the mass percentages of $SiO_2$, $TiO_2$ and $Al_2O_3$ is about 100 mass %.

2. The black quartz glass according to claim 1, wherein each content of metallic impurities other than Si, Ti and Al is 1 ppm or less.

3. The black quartz glass according to claim 1, wherein a brightness L* of the black quartz glass is 20 or less, an absolute value of the saturation a* of the black quartz glass is 2 or less and the absolute value of b* of the black quartz glass is 9 or less in an L*a*b* color system.

4. The black quartz glass according to claim 1, wherein a density of the black quartz glass is 2.3 g/cm$^3$ or more and 2.8 g/cm$^3$ or less.

5. The black quartz glass according to claim 1, wherein the black quartz glass has a corrosion rate of ⅕ or less compared to a corrosion rate of a molten quartz glass obtained by the same corrosion exposure test, wherein the corrosion rates is obtained by the following Corrosion Exposure Test:

(1) preparing a glass sample of 20 mm×20 mm×2 mm thickness and masking a 7 mm×7 mm area with a mask after forming an optical mirror surface on a surface of the glass sample to provide a masked glass surface with a masked area;

(2) etching an entire surface of the masked glass surface with a reactive ion-etching apparatus, at 200 W for 4 hours under 14 Pa of pressure in the apparatus, while flowing simultaneously $CF_4$ gas, $O_2$ gas and Ar;

(3) removing the mask from the masked glass surface and measuring a step size between the masked area and a corroded non-masked area; and (4) calculating the corrosion rate by the step size/etching time.

6. The black quartz glass according to claim 1, wherein a thermal expansion coefficient of the black quartz glass in the range of 30° C. to 600° C. is $20\times10^{-7}$/° C. or more and $30\times10^{-7}$/° C. or less.

7. The black quartz glass according to claim 1, wherein an optical transmittance of the black quartz glass at a wavelength of 200 nm to 3000 nm with a thickness of 1 mm is 0.1% or less.

8. The black quartz glass according to claim 1, wherein an SCE reflectance of the black quartz glass at a wavelength of 350 nm to 750 nm is 8% or less.

9. The black quartz glass according to claim 8, wherein a brightness L* of the black quartz glass is 20 or less, an absolute value of the saturation a* of the black quartz glass is 2 or less and the absolute value of b* of the black quartz glass is 9 or less in an L*a*b* color system.

10. The black quartz glass according to claim 9, wherein each content of metallic impurities other than Si, Ti and Al is 1 ppm or less.

11. The black quartz glass according to claim 10, wherein a density of the black quartz glass is 2.3 g/cm$^3$ or more and 2.8 g/cm$^3$ or less.

12. The black quartz glass according to claim 11, wherein the black quartz glass has a corrosion rate of ⅕ or less compared to a corrosion rate of a molten quartz glass obtained by the same corrosion exposure test, wherein the corrosion rates is obtained by the following Corrosion Exposure Test:

(1) preparing a glass sample of 20 mm×20 mm×2 mm thickness and masking a 7 mm×7 mm area with a mask after forming an optical mirror surface on a surface of the glass sample to provide a masked glass surface with a masked area;

(2) etching an entire surface of the masked glass surface with a reactive ion-etching apparatus, at 200 W for 4 hours under 14 Pa of pressure in the apparatus, while flowing simultaneously $CF_4$ gas, $O_2$ gas and Ar;

(3) removing the mask from the masked glass surface and measuring a step size between the masked area and a corroded non-masked area; and (4) calculating the corrosion rate by the step size/etching time.

13. The black quartz glass according to claim 12, wherein a thermal expansion coefficient of the black quartz glass in the range of 30° C. to 600° C. is $20\times10^{-7}$/° C. or more and $30\times10^{-7}$/° C. or less.

14. The black quartz glass according to claim 13, wherein an optical transmittance of the black quartz glass at a wavelength of 200 nm to 3000 nm with a thickness of 1 mm is 0.1% or less.

15. A method for producing black quartz glass comprising:

mixing 63 to 65 mass % of a $SiO_2$ powder, 18 to 24 mass % of a $TiO_2$ powder and 12 to 17 mass % of an $Al_2O_3$ powder, filling the mixed powder into a mold and then melting at a maximum temperature of 1700 to 1900° C. in an oxygen-free atmosphere, and cooling to room temperature to obtain the black quartz glass according to claim 1.

16. The method for producing black quartz glass according to claim 15, wherein the oxygen-free atmosphere is a reduced pressure of 100 Pa or less, a $N_2$ atmosphere, an Ar atmosphere, an He atmosphere or a combination thereof.

17. The method for producing black quartz glass according to claim 15, wherein the mold to be filled with the mixed powder has a shape similar to a shape after mechanical processing, with a volume of 1.01 or more of the shape after the mechanical processing.

18. A product comprising a black quartz glass member made of the black quartz glass according to claim 1.

19. The product according to claim 18, wherein the black quartz glass member is an optical component, a light-shielding member or an infrared heat absorption/storage member.

20. The product according to claim 19, wherein the optical component is a spectroscopic cell, a reflector for projectors or a connector for optical fibers, and the light-shielding member is a light-shielding member for semiconductor manufacturing apparatuses or for infrared heating apparatuses.

* * * * *